Sept. 13, 1932.  J. E. LILIENFELD  1,877,140
AMPLIFIER FOR ELECTRIC CURRENTS
Filed Dec. 8, 1928   2 Sheets-Sheet 1
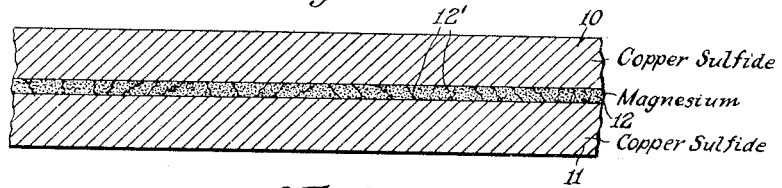
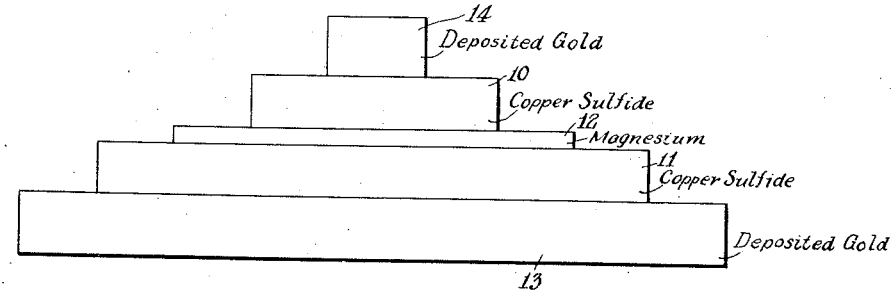
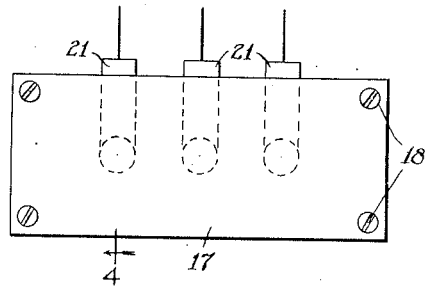  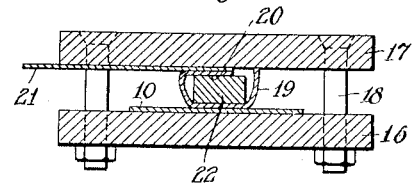
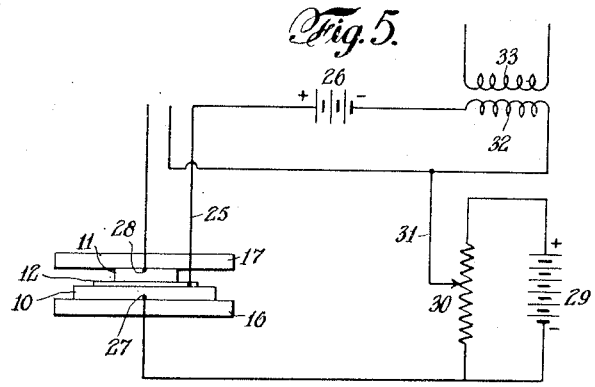
INVENTOR
Julius Edgar Lilienfeld
BY
ATTORNEY

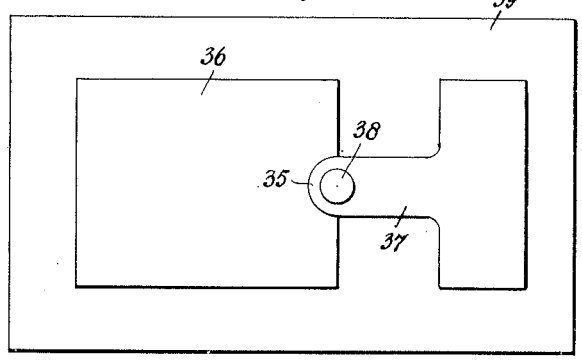
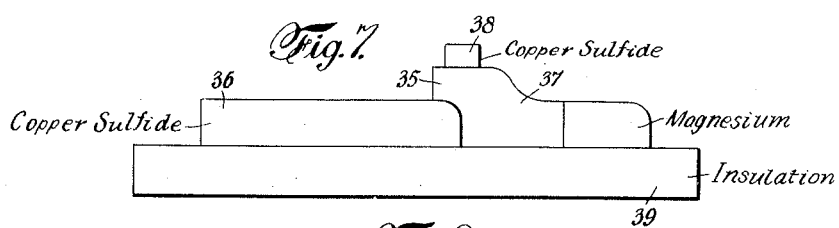
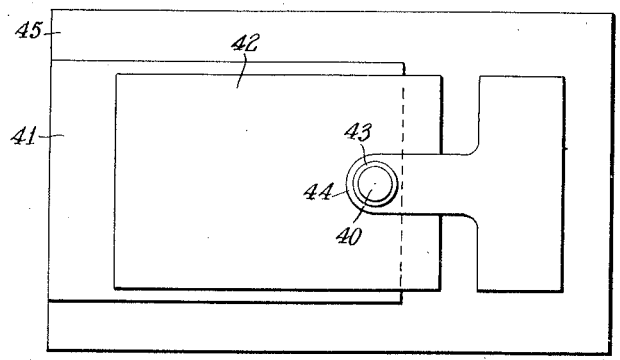
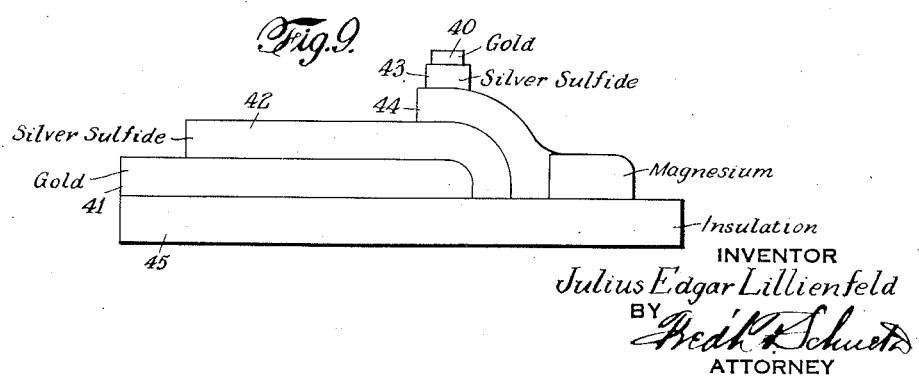

Patented Sept. 13, 1932

1,877,140

UNITED STATES PATENT OFFICE

JULIUS EDGAR LILIENFELD, OF CEDARHURST, NEW YORK

AMPLIFIER FOR ELECTRIC CURRENTS

Application filed December 8, 1928. Serial No. 324,794.

The invention relates to means for controlling the flow of an electric current, more especially in relation to the amplification of the same. Various devices such as relays, thermionic and otherwise, have been utilized for this purpose; and it is the object of the present invention to afford an extremely compact, simple and durable amplifying member which will be particularly efficient for the purpose intended and which, withal, may be constructed at small expense and have extremely long life. A further object of the invention is to construct a member of this character so that the same shall have but a minimum electrostatic capacity.

More particularly, the invention consists of an amplifier comprising two outer layers and an intermediate layer in intimate contact therewith, the materials constituting the said layers being such that the two outer layers form couples, preferably asymmetric couples, with the opposite faces of the intermediate layer. The latter, moreover, is made of minute thickness, of the order of magnitude of 200$\mu\mu$, such that by reason of its porosity, or suitable treatment, the same will offer minute passages between the outer layers for the flow of electric current therebetween.

Provision is made, also, to maintain the outer layers at potentials different from each other and also different from that of the intermediate layer, which is preferably at a potential opposite to the potential of the said outer layers. The intermediate layer then constitutes a blocking layer biased to vary the resistance to the flow of electric current between the outer layers; and is also adapted to have impressed thereon a source of varying potential, such as the input current to be amplified, the output current then being taken from the outer layers with the circuit thereof including a local source of potential.

The nature of the invention, however, will best be understood when described in connection with the accompanying drawings, in which:

Fig. 1 is a fragmentary vertical section through the novel amplifier and on a greatly exaggerated scale.

Fig. 2 is an elevation, on an enlarged and exaggerated scale, illustrating a modification.

Fig. 3 is a plan view and Fig. 4 a transverse vertical section, taken on the line 4—4, Fig. 3, illustrating one means of effecting electrical contact with the respective elements of the amplifier.

Fig. 5 is a diagrammatic view illustrating the electrical connections involved.

Fig. 6 and 7 are respectively a plan and a front elevation, on a greatly exaggerated scale, of an amplifier constructed in manner to reduce the electrostatic capacity thereof to a minimum; and Figs. 8 and 9 are similar views illustrating the construction applied to a modified form of the amplifier.

Referring to the drawings, the amplifier is indicated as constructed of a plurality of relatively thin layers of metal and compounds, the underlying principle of the amplifier being the couple—i. e., two conductors in contact with each other and of such a kind that a very high resistance is opposed to current at the transition over from one conductor to the other—and preferably the asymmetric couple. It is known that certain metals, for example magnesium, aluminum, tungsten, tantalum, etc., if brought into contact with certain compounds such as sulfides, selinides, oxides, for example, copper sulfide, silver sulfide, copper selinide, lead peroxide, etc., provide couples of a high resistance when the metal is at a positive potential and the compound negative. Asymmetric couples are also known consisting solely of compounds such as sulfides, oxides, etc. no pure metal being then involved.

In the present instance, two asymmetric couples of the aforesaid character are utilized, an element common to both being provided. For example, as shown in Fig. 1, the amplifier is constructed of three layers, the two outer layers 10 and 11 comprising a conducting polarizing compound such as copper sulphide, or copper bisulphide, silver sulfide, lead peroxide, magnesium sulfide, etc., while the intermediate layer 12 is of metal such as magnesium, or aluminum, tungsten, tantalum, etc. I have found that a very satisfactory amplifier may be constructed with the intermediate layer 12 consisting of magnesium, which may be spattered, condensed or otherwise deposited in a layer upon the surface of one of the outer layers of conducting polarizing compound such as of copper sulfide, and the other outer layer of conducting polarizing compound then spattered or deposited on the opposite uncovered surface of the layer 12.

In applying the intermediate layer 12, this operation should be so conducted that at least certain portions thereof will be of minute thickness, for example, of the order of magnitude of 200µµ, in order that these portions may be porus or contain breaks 12' which will be filled out by the material of the outer layers and offer passageways between the said outer layers for the flow of electric current therebetween. The degree of porosity may be increased or a porus break established in the layer by exerting pressure thereon sufficient to force the enclosing material therethrough.

In order to allow for convenient connection with the said outer layers, additional layers 13 and 14, Fig. 2, affording suitable bases as of a conducting material of a nonpolarizable character, such as nickel, platinum, gold, etc., may be provided over the respective layers 10 and 11. However, if the enclosing layers are especially thin, then one at least must be applied to a substantial base which may be of conducting or of insulating material.

More particularly, a conducting material is to be used for the base if the bottom layer is made of a material of comparatively low conductivity (silver sulfide). A very good base may consist of an electrolytically oxide-coated aluminum foil of 0.001 inch thickness. A foil of this character has the advantage of flexibility; and, moreover, further coatings adhere to it very well. Of course, an insulating base is formed thereby, considering the oxide coating; but, if a conducting base be required, an inert conducting layer, as of gold, must be applied over the oxide.

In the construction of the amplifier, the application of the various layers may conveniently be accomplished by beginning with the lowermost layer 13, which, in this case, would be a metal, then spattering the layer 11 thereon upon which in turn is spattered the layer 12 and over the latter the layer 10, while the final outer and upper layer 14 may be deposited, for example, electrolytically, upon the layer 10. This will afford a substantial and rugged construction of the amplifier; and it will be appreciated that the completed amplifier will occupy but very small space and a great number thereof may be connected in series in the usual and well-known manner.

Electrical contact to the layer 12 and the layers 13 and 14, or directly to the aforesaid layers 10 and 11, may be effected in any suitable manner, it being understood, however, that because of the minute thickness of these layers it is not feasible to provide the usual soldered connection. Means for exerting a pressure contact, preferably of a yielding nature, are therefore arranged to engage the exposed surfaces of the respective layers.

For example, and as illustrated in Figs. 3 and 4, the amplifier may be supported upon a rigid base plate 16 of insulating material and over said amplifier placed a further or top plate 17, also of insulating material, the two said plates being arranged to be drawn together as by means of the threaded bolts 18 at the four corners thereof. In addition, contact cups 19 are provided between the bottom and top plates, one for each of the layers of the amplifier to which contact is to be made. These cups consist, for example, of flexible or pliable metal provided with an inwardly directed tab 20, designed to hold between itself and the corresponding base a terminal strip 21 as of metal foil. The bottom of the cup rests against the particular layer, as the layer 10, with which contact is desired; and a block of resilient rubber 22 contained by the cup affords ample pressure, when the base and top plates are clamped down, to insure a positive and reliable contact.

In the operation of these amplifiers, connection is made from the intermediate or common layer to a biasing voltage, for example, in the specific illustration hereinbefore set forth, to a positive voltage through the lead 25 to a source 26. The terminals 27 and 28 of the amplifier, moreover, are so connected that the other layers 10 and 11 will be maintained at a potential of the same sign, in the present instance negative; and this is effected by connecting the one terminal 28 through the output circuit with the negative side of the source of potential 26 while the terminal 27 of the layer 10 is connected to the negative side of a further source of potential 29.

A potentiometer 30 is provided across the source of potential 29 and is connected through lead 31 also with the negative side of the source of potential 26. In the circuit of the latter, furthermore, is provided a transformer 32 or other suitable coupling by which the input circuit 33 may be coupled to the amplifier; and it will be noted that variations produced in this input circuit will correspondingly affect the potential of the layer 12 with respect to the layer 10 and also to the layer 11.

In the initial formation of the amplifier, this layer is to be polarized by impressing a sufficiently high voltage between the same and the outer layers 10 and 11. When this is once effected, a high resistance will be established between 10 and 12 and also between 11 and 12. Therefore, current flowing from the intermediate layer to the respective outer layers will be negligible; while, on the other hand, as the normal biasing potential of layer 12 is changed with each impulse derived from the input circuit, the resistance between the layers 10 and 11 will be changed correspondingly and a greatly magnified effect results with respect to the current flowing between the said outer layers. The flow of current between layers 10 and 11 will, therefore, change with the bias of the intermediate layer 12 becoming more positive or more negative.

The amplifier may be operative also if the outer layers be constituted by the polarizable metal and the intermediate layer by a conducting polarizing compound. In such case, however, the bias of the intermediate layer should be negative, while in the previous case it was positive.

These biasing voltages, moreover, may be of any value so long as they do not destroy the positive (or negative) insulating property of the intermediate layer; and with magnesium and copper sulfide as the materials constituting the amplifier, the biasing voltage may vary between +15 volts and zero volts. As a limiting case, however, a slightly negative bias (or positive) may be admissible so long as it does not break down the insulation effect of layer 12 against the layers 10 and 11 which requires a slight voltage, for example, of the order of magnitude of a few tenths of a volt.

Where the requirements are such that electrostatic capacity should be low, this may readily be attained by reducing the actual contacting areas to a minimum. For example, reference being had to Figs. 6 and 7, the intermediate layer 35, as of magnesium, is made to cover only a small portion of the underlying layer 36 consisting of copper sulfide, as by means of an arm 37 thereof overhanging an edge portion of the sulfide layer, while the uppermost layer 38 is merely in the nature of a small spot. A base 39 of insulation material supports the entire device; and contact may be made to the various layers as in the manner hereinbefore described.

Figs. 8 and 9 show a similar arrangement but wherein additional outer or terminal layers 40 and 41, as of gold, are provided over the respective outer layers 42 and 43, of silver sulfide in this instance, with intermediate layer 44 of magnesium—all being mounted on an insulation base 45. In this embodiment, the respective layers are likewise of progressively less contacting area, whereby capacity is reduced to inappreciable amounts.

I claim:

1. An amplifier for electric currents, comprising two outer layers and an intermediate layer in intimate contact therewith, the layers being of material such that asymmetric couples are formed by the respective outer layers with the opposite faces of the intermediate layers and being interconnected in part thereby, means to apply potentials of same sign to the outer layers, and means to apply a potential of the opposite sign to the intermediate layer.

2. An amplifier for electric currents, comprising two outer layers and an intermediate layer in intimate contact therewith, the layers being of material such that asymmetric couples are formed by the respective outer layers with the opposite faces of the intermediate layer, the latter offering minute passageways between the outer layers for the flow of electric current therebetween, means to apply potentials of same sign to the outer layers, and means to apply a potential of the opposite sign to the intermediate layer.

3. An amplifier for electric currents, comprising two outer layers and an intermediate layer in intimate contact therewith, the layers being of material such that asymmetric couples are formed by the respective outer layers with the opposite faces of the intermediate layer and being interconnected in part thereby, and means to maintain the outer layers at a potential of same sign and the intermediate layer at the opposite sign.

4. An amplifier for electric currents, comprising two outer layers and an intermediate layer in intimate contact therewith, the layers being of material such that asymmetric couples are formed by the respective outer layers with the opposite faces of the intermediate layer, the latter offering minute passageways between the outer layers for the flow of electric current therebetween, means to maintain the outer layers at a potential of same sign and the intermediate layer at the opposite sign, and means to impress upon the intermediate layer a potential varying with respect to the two outer layers.

5. An amplifier for electric currents, comprising two outer layers of polarizing conducting elements and an intermediate polarizable conducting element, the latter being in intimate contact with the former and having portions of sub-microscopic thickness, means to maintain the outer elements at a potential of same sign and the intermediate element at the opposite sign, and means to impress a varying potential upon the intermediate element.

6. An amplifier for electric currents, comprising two outer layers of like polarizing conducting compound and an intermediate polarizable conducting element, the latter being in intimate contact with the former and having portions of sub-microscopic thickness, means to maintain the outer elements at a potential of same sign and the intermediate element at the opposite sign, and means to impress a varying potential upon the intermediate element.

7. An amplifier for electric currents, comprising two outer layers of like polarizing conducting compound and an intermediate polarizable metal, the latter being in intimate contact with the former and having portions of sub-microscopic thickness, means to maintain the outer elements at a potential of same sign and the intermediate element at the opposite sign, and means to impress a varying potential upon the intermediate element.

8. An amplifier for electric currents, comprising two outer layers of polarizing conducting elements, an intermediate blocking layer having portions of sub-microscopic thickness and interconnecting in part said outer layers, the said intermediate layer being permanently positively biased to vary resistance to flow of electric current between the outer layers, means to apply potentials of same sign to the outer layers, and means to apply a potential of the opposite sign to the intermediate layer.

9. An amplifier for electric currents, comprising two outer layers of polarizing conducting elements and an intermediate polarizable conducting element, the latter being in intimate contact with the former and having portions of sub-microscopic thickness, means to maintain the outer elements at a potential of same sign and the intermediate element at the opposite sign, means to impress a varying potential upon the intermediate element, and terminal members associated with the respective outer elements.

10. An amplifier for electric currents, comprising two outer layers of polarizing conducting elements and an intermediate polarizable conducting element, the latter being in intimate contact with the former and having portions of sub-microscopic thickness, a source of potential, a potentiometer connected across the same, the negative terminal thereof being connected to one of the outer elements, a second source of potential, the positive terminal thereof being connected to the intermediate element and its negative terminal to the other of the outer elements and also to the other terminal of the said potentiometer.

11. An amplifier for electric currents, comprising two outer layers of polarizing conducting elements and an intermediate polarizable conducting element, the latter being in intimate contact with the former and having portions of sub-microscopic thickness, a source of potential, a potentiometer connected across the same, the negative terminal thereof being connected to one of the outer elements, a second source of potential, the positive terminal thereof being connected to the intermediate element and its negative terminal to the other of the outer elements and also to the other terminal of the said potentiometer, and means to impress a voltage upon the circuit of the second-named source of potential.

12. An amplifier for electric currents, comprising a strip of magnesium of minute thickness, layers of copper sulfide in intimate contact with opposite faces of the magnesium, means to positively bias the said magnesium strip, means to maintain the copper sulfide layers at a negative potential, and means to impress a varying potential to the magnesium.

13. An amplifier of the nature set forth and embodying a plurality of superposed layers forming couples, characterized by having an intermediate layer make contact with adjacent opposite layers over a small portion of its total superficial area only, to interconnect in part said layers, means to apply potentials of same sign to the outer of the superposed layers, and means to apply a potential of the opposite sign to the intermediate layer.

14. An amplifier of the nature set forth and embodying a plurality of superposed layers forming couples, characterized by having the respective layers of progressively smaller contact area, an intermediate layer interconnecting in part the adjacent layers, means to apply potentials of same sign to the adjacent layers, and means to apply a potential of the opposite sign to the intermediate layer.

15. In an amplifier for electric currents, comprising couples in the form of superposed layers: means for making electrical contact with the respective layers, comprising a metallic cup-shaped element, the bottom of which is adapted to rest upon a corresponding layer and having a tab directed inwardly over the mouth of the cup, a terminal strip extending over said tab and outwardly therefrom, resilient means contained within the cup between the bottom thereof and said tab, and means upon opposite sides of the cup pressing respectively against the said layer and terminal strip to exert pressure upon the resilient means.

16. In an amplifier for electric currents, comprising couples in the form of superposed layers: means for making electrical contact with the respective layers, comprising a metallic cup-shaped flexible element, the bottom of which is adapted to rest upon a corresponding layer and having a flexible tab directed inwardly over the mouth of the cup, a terminal strip extending over said tab and outwardly therefrom, resilient means contained within the cup between the bottom thereof and said tab, and insulating means upon opposite sides of the cup pressing respectively against the said layer and terminal strip to exert pressure upon the resilient means.

In testimony whereof I affix my signature.
JULIUS EDGAR LILIENFELD.